Aug. 26, 1958       R. LUCIEN        2,849,225
ELASTIC SUSPENSION SYSTEM FOR VEHICLES
AND ESPECIALLY AUTOMOBILES
Filed Feb. 1, 1955
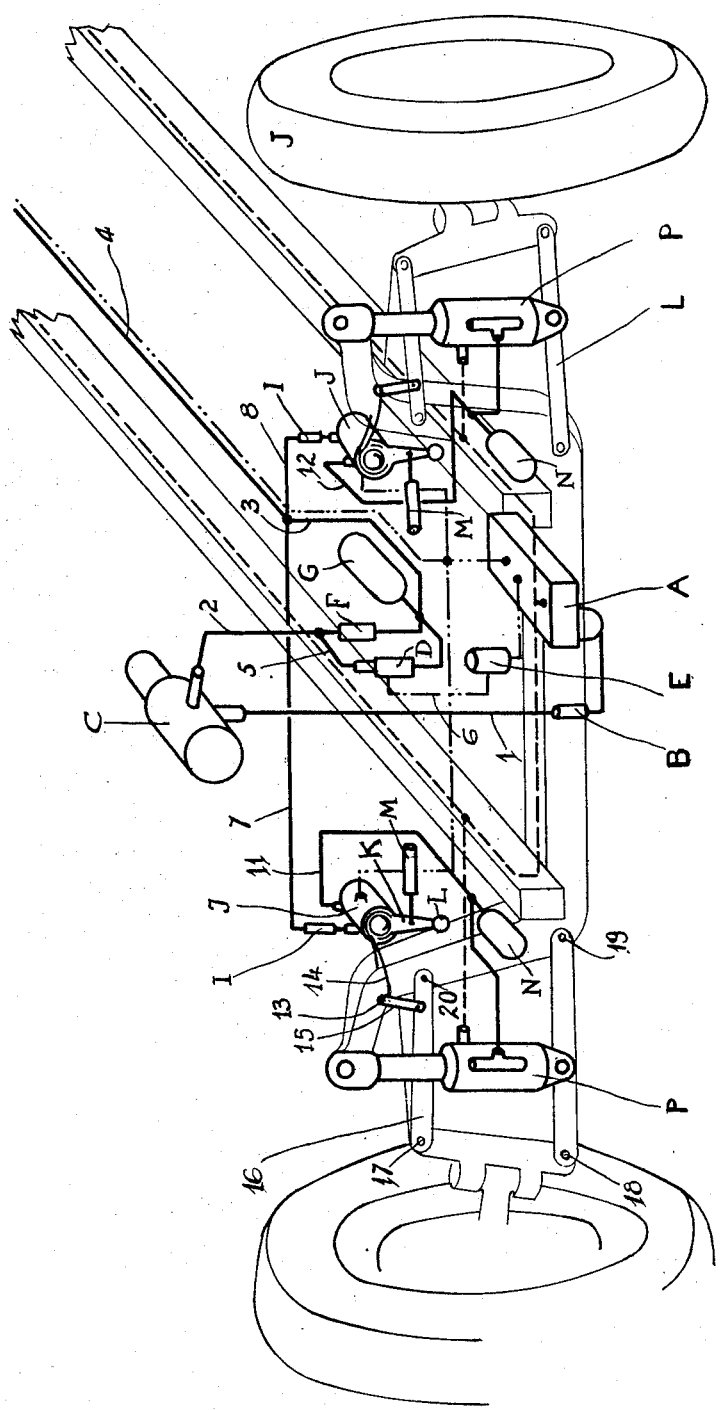

United States Patent Office 2,849,225
Patented Aug. 26, 1958

2,849,225

ELASTIC SUSPENSION SYSTEM FOR VEHICLES AND ESPECIALLY AUTOMOBILES

René Lucien, Paris, France

Application February 1, 1955, Serial No. 485,553

Claims priority, application France September 3, 1954

3 Claims. (Cl. 267—11)

In the patent application Serial No. 485,552 filed February 1, 1955, now abandoned, the applicant has described an elastic suspenion system in which, between each wheel and a neighboring point on the chassis, there is interposed a hydraulic jack, each jack working under the control of an oil distributor serving to apply to the said jacks or to evacuate therefrom oil under pressure, depending on whether the point considered on the chassis is above or below a pre-determined level with respect to the ground, each jack constituting, together with an oleopneumatic accumulator, an independent oscillation-damping device.

This system ensures in a specially effective manner the transverse stability of the vehicle by producing an anti-rolling effect which has only generally been obtained up to the present time by means of mechanical devices such as those known as torsion bars. The present invention has for its object an improvement described in the application referred to above.

The objects to be attained are as follows:

(1) To avoid causing the distributors to be worked by the rapid oscillations of the chassis and, in consequence, to reduce their wear and to reduce oil consumption.

(2) To increase the anti-rolling effect.

The suspension in accordance with the invention is characterised in that each distributor, actuated as in the previous case by the displacements of the wheel with respect to the chassis, is operated through the medium of a flexible member; and in that, on the other hand, with the moving part of the distributor, there is associated a swinging mass the inertia of which acts in opposition to its displacements under the effect of rapid oscillations of the wheel with respect to the chassis, but which, under the effect of large transverse accelerations, oscillates on its own account, this movement being used to give the displacement of the moving member of the distributor an amplitude greater than that which would result from the single kinematic control due to the displacements of the wheel, and thereby to permit of a more powerful action of the distributor.

It will be observed that the same pendulum mass has two effects which at first sight appear contradictory: To leave the distributor at rest when the oscillations are rapid and of small amplitude; and to increase its effectiveness when the oscillations tend to assume a large amplitude due to the effect of large transverse accelerations.

One form of embodiment of a suspension system in accordance with the invention is described below by way of example and not in any limiting sense, and is illustrated in the attached drawing.

The single figure shows in perspective and in fine lines, a portion of the chassis of an automobile vehicle and its coupling to the wheels and, in heavy lines, the arrangement of the suspension which forms the object of the present invention. The arrangement is the same in the case of all four wheels, only the front pair of wheels having been shown.

As in the case of the application previously referred to, the chassis is supported at four points by means of hydraulic jacks P, P, supplied with oil by the distributors J, J; a pump C draws the oil from a reservoir A through a conduit 1, and delivers it into a pressure conduit 2, 3, 4. An oleo-pneumatic buffer accumulator is connected to the conduit 2 and also to a diversion conduit 5 passing through a by-pass D which, when the pressure reaches a certain limiting value, diverts the oil towards the reservoir A through the conduit 6. A non-return valve F prevents the return of the oil to the pump. Two filters B, E, are provided to prevent the passage of foreign bodies.

Branch conduits 7, 8 are led-off from the main conduits 2, 3, 4, to the distributors J, J. These branches are provided with non-return valves I, I. In the example shown, the distributors are of the rotary type. From each distributor leads a conduit 11, 12, respectively, which brings the oil under pressure to the corresponding jack P or removes the pressure from the jack, depending on the angular position of the moving member of the distributor. One these conduits 11, 12 are respectively coupled oleopneumatic accumulators N, N. The evacuated oil is returned to the reservoir A through the distributors and thence by conduits shown in chain-dotted lines. Any possible leakages of oil through the jacks are returned to the reservoir by means of the conduits shown in broken lines.

That part of the arrangement applied to the right-hand wheel only will be described, since the arrangement for the left-hand wheel is exactly symmetrical with it. The body of the distributor J, which is rigidly fixed to the chassis, has its axis parallel to the longitudinal axis of the vehicle. It is operated by the movements of the wheel with respect to the chassis. In the example shown, this control is carried out by means of a small link 15 pivotally attached on the one hand to the linkage 16 of the articulated quadrilateral linkage system, the summits of which are shown at 17, 18, 19 and 20 and, on the other hand, to one extremity 13 of a leaf spring 14, the other extremity of which is rigidly coupled to the shaft of the rotating member of the distributor. To this shaft is fixed a lever K which carries at its extremity a weight L. To this lever K is pivotally fixed the piston-rod of a dash-pot M. The variations in height of the chassis with respect to the ground give rise to variations of the inclination of the linkage 16 about the axis 20 and these movements produce variations in the angular position of the moving member of the distributor through the small link 15 and the spring 14. These latter variations enable the height of the point of suspension of the chassis to be regulated with respect to the ground whatever may be the load carried by the wheel, as has already been explained in the patent application referred to above.

If the chassis is subjected to rapid oscillations of small amplitude, the spring 14 is flexed, but the inertia of the weight L prevents displacement of the rotary member of the distributor which results in a saving of oil and a reduction in wear. On the other hand, if the oscillations of the chassis assume a greater amplitude with the vehicle running in a straight line, the spring 14 transmits sufficient force to drive the distributor which then performs its function in restoring the position of the chassis by supplying oil under pressure to the jack or by evacuating the oil from the jack.

But if the oscillations occur in the transverse sense, such as is especially the case at a turning, the pendulum mass is displaced from its central position by centrifugal force. Its mass and the length of the pendulum arm are determined so that, under the effect of centrifugal force, the rotary member of the distributor turns through an angle which is greater than that which would result from the single kinematic coupling of the chassis to the wheels.

The result of this is to cause a more rapid and more powerful action of the distributor. The system thus produces an anti-rolling effect which is extremely effective.

As in the case of the application referred to above, the jack, together with the accumulator N, carries out the function of a spring and the oscillations are damped by means of valves which restrict to a greater or less extent the entry or the discharge of oil from the jack.

What I claim is:

1. An oleo-pneumatic suspension for a vehicle having wheels, and comprising, for each wheel, relatively movable elements connected respectively to the chassis and to the wheels; a hydraulic jack connected respectively to one of said movable elements and to the chassis, a hydraulic distributor connected, on one hand, to a source of pressure liquid, and on the other hand, to the cylinder of the jack, an oleo-pneumatic accumulator connected to the distributor and jack; the distributor being adapted to supply liquid to the jack to extend it and to withdraw liquid therefrom to retract it, the body of said distributor being fixed to the chassis and having a movable actuating member, a resilient element connecting the actuating member to the element movable with the wheel relative to the chassis, said resilient connecting element being adapted to be flexed with respect to the relative displacement of the wheel and the chassis, thereby to move the actuating member, said distributor further comprising a pendulous mass, the actuating member of said distributor being rigidly coupled to said pendulous mass which is adapted by reason of its inertia to resist movement of the actuating member of said distributor.

2. An oleo-pneumatic suspension as claimed in claim 1 wherein the said distributor is of the rotary type having its axis of rotation parallel to the longitudinal axis of the vehicle, and wherein said resilient element comprises a leaf spring flexible in a vertical plane and having one end fixed to the actuating member, and the other end connected to the element movable with a wheel relative to the chassis, and wherein said pendulous mass is rigidly fixed to the distributor actuating member and is constituted by a pendulum the length and mass of which are so determined that when the vehicle negotiates a curve, the amplitude of angular displacement of the pendulum is greater than the angular displacement that would be imparted to the actuating member of the said distributor if acted upon only by the flexible leaf spring with the chassis moving relatively to the wheel in response to centrifugal force due to the passage of the vehicle around a curve.

3. An oleo-pneumatic suspension as claimed in claim 2 further comprising a dash-pot interposed between said pendulum and a fixed point on the chassis.

References Cited in the file of this patent

UNITED STATES PATENTS

| | | |
|---|---|---|
| 886,617 | Lovejoy | May 5, 1908 |
| 2,492,990 | Hanna | Jan. 3, 1950 |
| 2,620,182 | Marston et al. | Dec. 2, 1952 |
| 2,644,699 | Weiertz et al. | July 7, 1953 |

FOREIGN PATENTS

| | | |
|---|---|---|
| 1,082,626 | France | June 23, 1954 |